(12) United States Patent
Yu et al.

(10) Patent No.: US 8,714,042 B2
(45) Date of Patent: May 6, 2014

(54) CONTROLLABLE STEERING RACK GUIDE SYSTEM AND METHOD

(75) Inventors: Jinghong Yu, Dublin, OH (US); Daniel Vogel, Columbus, OH (US)

(73) Assignee: Honda Motor Co., Ltd., Tokyo (JP)

(*) Notice: Subject to any disclaimer, the term of this patent is extended or adjusted under 35 U.S.C. 154(b) by 854 days.

(21) Appl. No.: 12/814,593

(22) Filed: Jun. 14, 2010

(65) Prior Publication Data

US 2011/0303028 A1 Dec. 15, 2011

(51) Int. Cl.
 *F16H 35/00* (2006.01)
 *F16H 1/04* (2006.01)

(52) U.S. Cl.
 USPC .......................... 74/422; 74/388 PS (58) Field of Classification Search
 USPC .............................. 74/388 PS, 422
 See application file for complete search history.

(56) References Cited

U.S. PATENT DOCUMENTS

| 4,709,593 A | 12/1987 | Takeuchi |
| 5,265,691 A | 11/1993 | Konishi et al. |
| 6,145,400 A * | 11/2000 | Garza .......................... 74/422 |
| 6,239,568 B1 | 5/2001 | Sugitani et al. |
| 6,412,591 B1 | 7/2002 | Endo et al. |
| 6,619,420 B1 | 9/2003 | Saarinen |
| 6,814,190 B1 | 11/2004 | Olschewski et al. |
| 2008/0034910 A1 * | 2/2008 | Roline et al. .................... 74/422 |
| 2009/0107271 A1 | 4/2009 | Matsuo et al. |
| 2009/0320630 A1 * | 12/2009 | Bayer et al. .................... 74/409 |
| 2011/0097140 A1 | 4/2011 | Yu et al. |

FOREIGN PATENT DOCUMENTS

| JP | 6053465 | 3/1985 |
| JP | 2005104416 | 4/2005 |
| JP | 200783940 | 4/2007 |

OTHER PUBLICATIONS

International Search Report and Written Opinion of PCT/US2011/037269 dated Sep. 2, 2011.

* cited by examiner

*Primary Examiner* — David M Fenstermacher
*Assistant Examiner* — Terence Boes
(74) *Attorney, Agent, or Firm* — Rankin, Hill & Clark LLP (57) ABSTRACT

A controllable steering rack guide system includes a pinion having pinion gear teeth and a steering rack having rack gear teeth engaged with the pinion gear teeth of the pinion. A rack guide is radially moveable relative to the steering rack for applying a radial force to the steering rack. A primary spring applies a compression force on the rack guide for forcing the rack guide radially toward the steering rack. The compression force of the primary spring is continuously adjustable during operation of the pinion and the steering rack.

22 Claims, 5 Drawing Sheets

CONTROLLABLE STEERING RACK GUIDE SYSTEM AND METHOD

BACKGROUND

Exemplary embodiments herein generally relate to vehicle steering systems, and more particularly relate to a controllable steering rack guide system and method.

Vehicle drift or pull is a phenomenon where the vehicle tends to drift to one side or a biased steering holding is required to keep the vehicle to maintain straight-line accelerating, cruising and/or braking. Vehicle drift/pull can cause unpleasant handling instability as well as human fatigue. Meanwhile, steering kickback is the steering torque variation when the vehicle is driven on a rough road. Excessive steering kickback is one of the factors known to cause poor ride comfort. While steering kickback is mainly caused by external disturbances, such as uneven road surfaces, vehicle drift/pull can be caused either externally, such as by canted road surfaces or side wind, or internally, such as by asymmetric chassis design.

To address vehicle drift/pull and kickback performance, steering systems sometimes use the application of supplemental friction. For example, mechanical frictions can be increased in a vehicle chassis's system, such as suspension strut bearing friction and steering gearbox friction. The problem with this kind of supplemental friction is that it is passive and non-controllable. Moreover, the friction amount can degrade over time and cause poor steering feel and performance.

Other approaches for dealing with vehicle drift/pull and kickback performance include applying a supplemental power assist force and/or applying a supplemental vibration in the steering system. A drawback of applying a supplemental power assist force is that it increases the reliability concern on self-steering and is generally limited in application to electronic power steering vehicles only. A drawback of applying supplemental vibration is that it is often complicated and difficult to completely tune. As a result, the supplemental vibration can result as a new source of vibration and noise in the vehicle. Still another approach is to apply supplemental controllable friction in the steering system. However, known systems that apply supplemental controllable friction apply such friction only to the steering column shaft and are often complex and expensive.

SUMMARY

According to one aspect, a controllable steering rack guide system includes a pinion including pinion gear teeth and a steering rack including rack gear teeth engaged with the pinion gear teeth of the pinion. A rack guide is radially moveable relative to the steering rack for applying a radial force to the steering rack. A primary spring applies a compression force on the rack guide for forcing the rack guide radially toward the steering rack. The compression force of the primary spring is continuously adjustable during operation of the pinion and the steering rack.

According to another aspect, a steering rack guide assembly for applying a variably controlled friction force on a rack guide in a vehicle includes a primary spring and a linearly displaceable rack guide applying the variably controlled friction force on the rack guide. The primary spring has a first end linearly fixed relative to the rack guide and a second end moveably adjustable relative to the first end for adjusting a compression force of the primary spring applied to the rack guide during operation of the vehicle.

According to still another aspect, a method is provided for applying a controllable friction force to a steering rack in a vehicle. In the method according to this aspect, a primary compression force is applied to the steering rack from a primary compression spring. The primary compression force of the primary compression spring is variably adjusted during operation of the vehicle.

DETAILED DESCRIPTION

Figure 1:
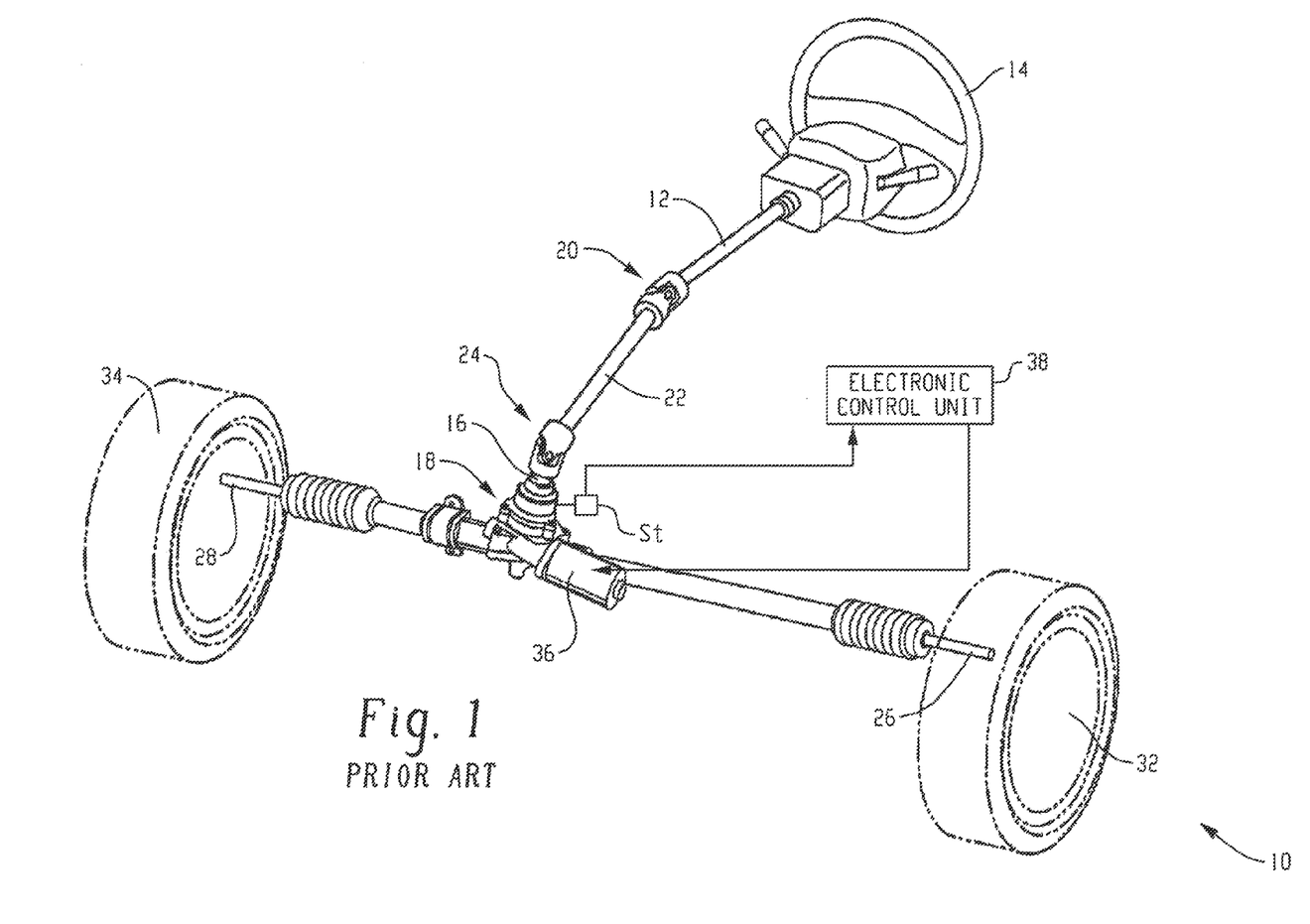
FIG. 1 is a schematic view of a vehicle's steering system.

Referring now to the drawings, wherein the showings are for purposes of illustrating one or more exemplary embodiments and not for purposes of limiting same, FIG. 1 schematically illustrates a steering system 10 for a vehicle. In the illustrated embodiment, in the steering system 10 an upper steering shaft 12 designed to rotate together with a steering wheel 14 is connected to a pinion shaft 16 protruding from a steering gear box housing 18 via an upper universal joint 20, a lower steering shaft 22 and a lower universal joint 24. Tie rods 26, 28 protruding from left and right ends of a steering gear box 18 can be connected to knuckles (not shown) of the left and right wheels 32, 34 of the vehicle on which the steering system 10 is installed.

An assist motor 36 can be supported by and/or connected to the steering gear box 18. Operation of the assist motor 36 can be controlled by an electronic control unit 38 into which a signal is inputted from a steering torque detecting device St housed in the steering gear box housing 18. In the illustrated embodiment, the motor 36 is a brushless DC electric motor, though this is not required. Alternatively, the motor 36 could be a hydraulic motor for hydraulically providing power assist in the steering system 10.

Figure 2:
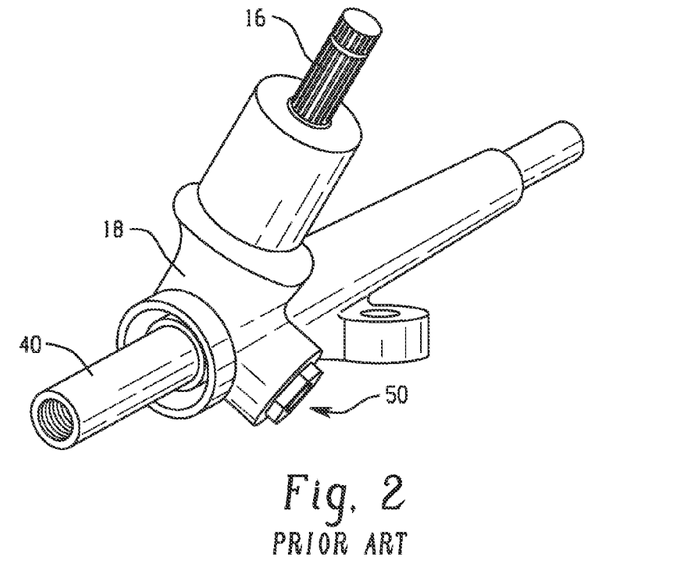
FIG. 2 is a partial schematic view of a steering gear box housing wherein a pinion shaft is operatively connected to a steering rack in the steering system.
Figure 3:
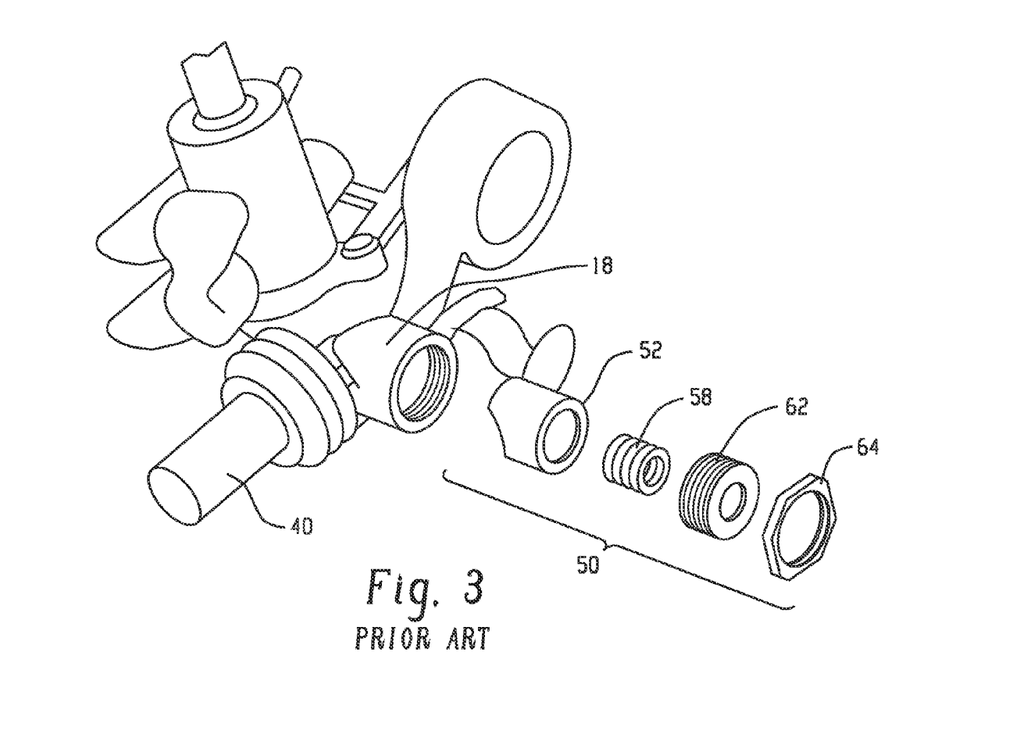
FIG. 3 is an exploded view of a known rack guide assembly received in the steering gear box housing.
Figure 4:
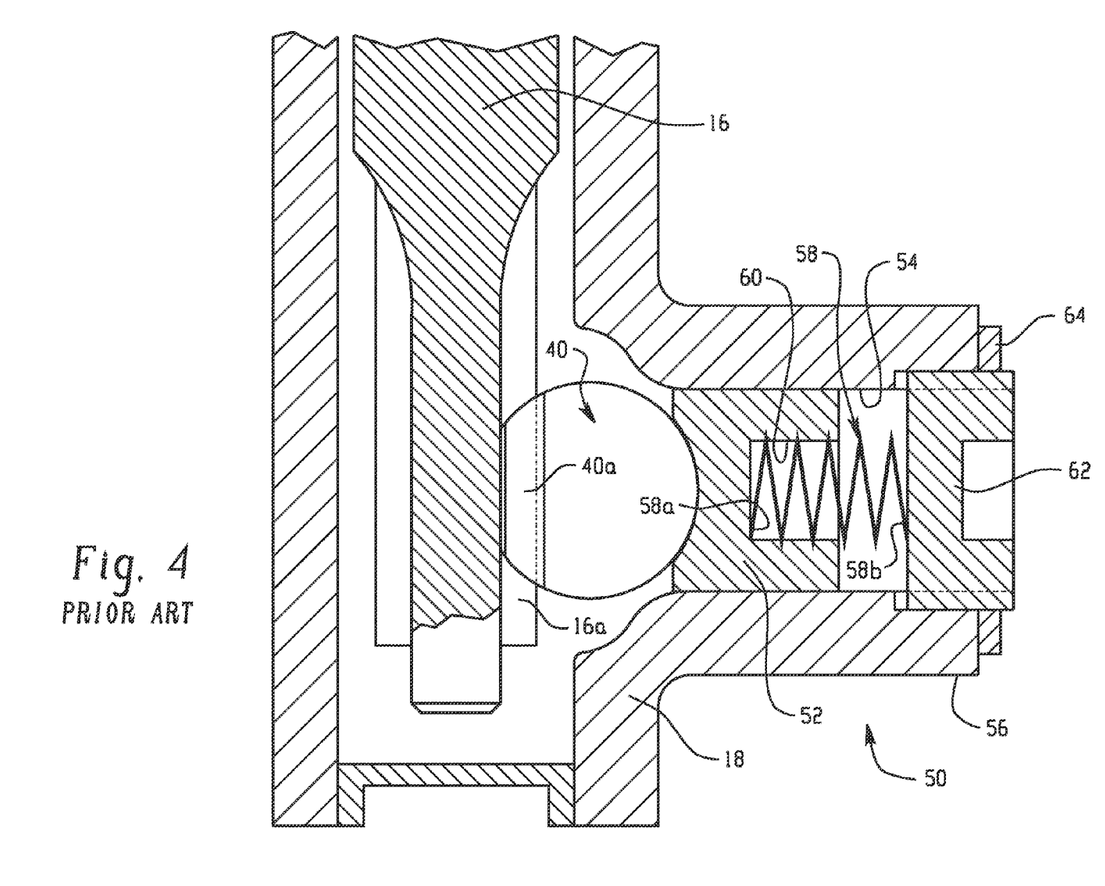
FIG. 4 is a schematic view of the known rack guide system in an assembled state.

Inside the steering gear box housing 18, with additional reference to FIGS. 2-4, the pinion shaft 16 is meshingly engaged with a steering rack 40, which has its opposite axial ends connected to inner lateral ends of the tie rods 26, 28 (the connections between the steering rack 40 and the tie rods 26, 28 are not shown). In particular, as best shown in FIG. 4, the pinion or pinion shaft 16 includes pinion gear teeth 16a. The steering rack 40 likewise includes rack gear teeth 40a, the teeth 40a meshingly engaged with the teeth 16a of the pinion 16.

In FIGS. 2-4, a known steering rack guide system or assembly 50 is illustrated that includes the pinion 16, the steering rack 40 and a rack guide 52 radially moveable relative to the steering rack 40 for applying a radial force to the steering rack 40. More specifically, the rack guide 52 is slidably fitted into a guide hole or aperture 54 defined in a rack guide housing portion 56 of the steering gear box housing 18. The rack guide 52 is urged or biased radially toward the rack 40 by a spring 58. This urges or biases the rack guide 52 into the pinion 16. As shown in FIG. 4, one end 58a of the spring 58 is received within a recess 60 defined in the rack guide 52, whereas the other end 58b of the spring 58 is received against a rack guide screw 62. As shown, the rack guide screw 62 can be threadedly engaged with the rack guide housing portion 56 to close an open end of the guide hole 54. A lock nut 64 can be threadedly received on the rack guide screw 62 to axially lock the rack guide screw 62 in position relative to the housing portion 56.

While it is possible that the rack guide screw 62 can be selectively positioned relative to the housing portion 56 when it is installed to thereby compress the spring 58 a desired amount, such selective positioning of the rack guide screw 62 relative to the rack guide 52 remains substantially constant during vehicle operation and thus the compression force exerted by the spring 68 on the rack guide 52, and in turn on the steering rack 40, also remains substantially constant during operation of the pinion 16, and the steering rack 40, and more generally during operation of the vehicle in which the steering system 10 is installed. One problem with this known arrangement is that the friction force applied against the steering rack 40 is generally passive and non-controllable. Moreover, the friction force can degrade with time and thereby cause poor steering feel and downgraded steering performance.

Figure 5:
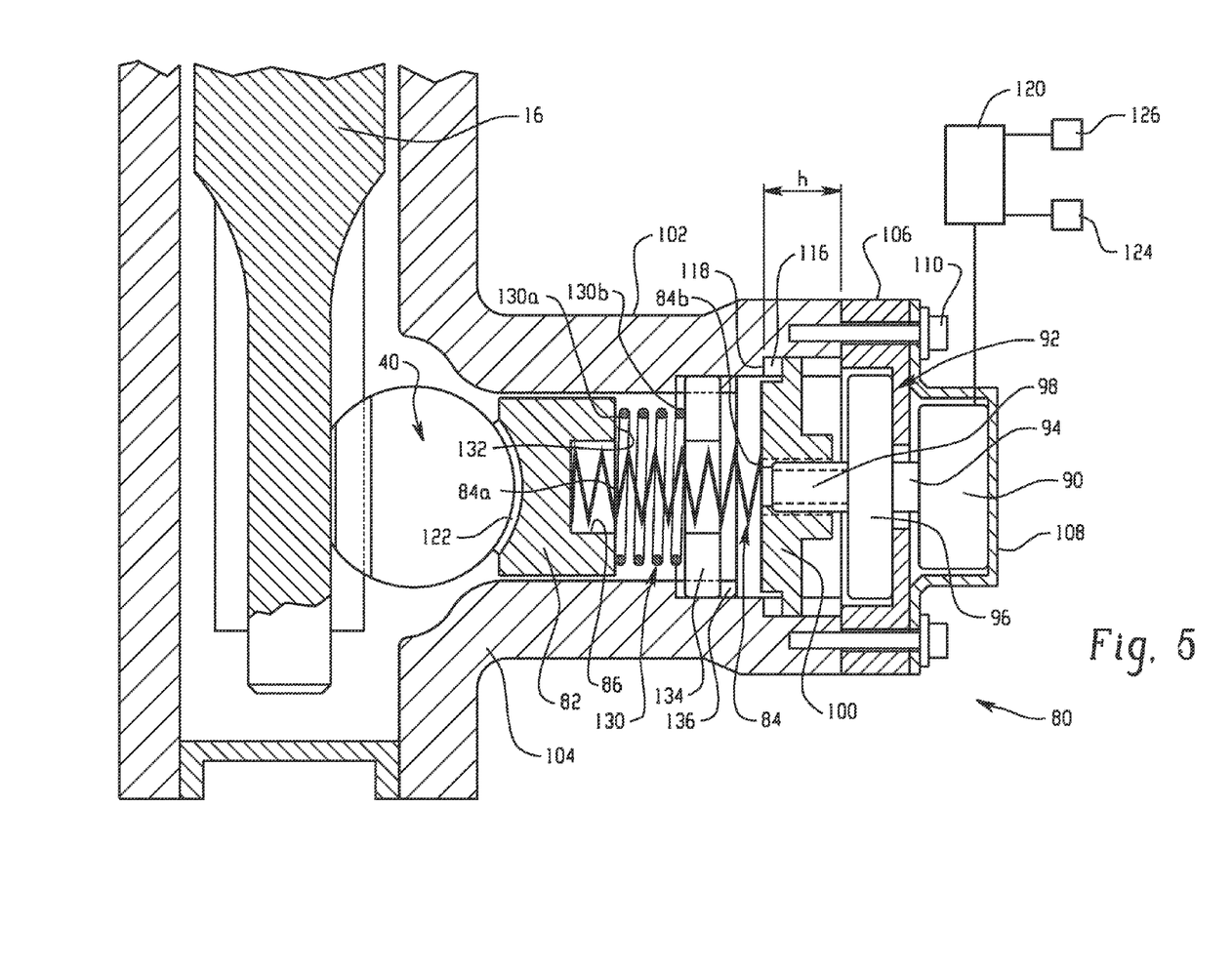
FIG. 5 is a schematic view of an improved controllable steering rack guide system in an assembled state.

With reference to FIG. 5, a controllable steering rack guide system or assembly 80 will now be described that applies a variably controlled friction force on a rack guide in a vehicle. The rack guide system 80 can be substituted for the rack guide system 50 described hereinabove and thus can be used with the same pinion 16 including pinion gear teeth 16a and steering rack 40 including gear teeth 40a engaged with the gear teeth 16a of the pinion 16. The rack guide system 80 further includes a rack guide 82 radially moveable relative to the steering rack 40 for applying a radial force to the steering rack 40. Unlike the rack guide 52 of FIG. 4, the rack guide 82 of FIG. 5 is a linearly displaceable rack guide that applies a variably controlled friction force on the steering rack 40 as will be described in more detail below.

The rack guide system 80 further includes a primary spring 84 applying a compression force on the rack guide 82 for forcing the rack guide 82 radially toward the steering rack 40. As will be described in more detail below, the compression force of the primary spring 84 is continuously adjustable during operation of the pinion 16 and the steering rack 40, and more generally during operation of the vehicle. As shown, a rack guide seat 122 can be interposed between the rack guide 82 and the steering rack 40 for transferring load forces from the rack guide 82 to the steering rack 40. The rack guide seat 122 can be a separate component or can be part of the rack guide 82. The materials used to make the components of the controllable steering rack guide system 80 and/or the specific types of components used can be suitably selected by one of ordinary skill in the art. For example, the rack guide seat 122 can be formed of plastic, Teflon, bronze and/or brass.

In particular, the compression force of the primary spring 84 is continuously adjustable by varying an amount of compression of the primary spring 84. In the illustrated embodiment of FIG. 5, the amount of compression of the primary spring 84 can be varied by adjusting a relative position of an end of the primary spring 84 that is opposite the rack guide 82. More specifically, the primary spring 84 can have a first end 84a linearly fixed relative to the rack guide 82, or at least linearly fixed in that the end 84a cannot advance any farther into the rack guide 82 than is shown in FIG. 5. More specifically, in the illustrated embodiment, the rack guide 82 defines a recess 86 that receives the end 84a of the primary spring 84. The bottom of the recess 86 can limit movement of the end 84a of the primary spring 84 further into the rack guide 82. The primary spring 84 can also have a second end 84b (i.e., the end opposite the rack guide 82) that is moveably adjustable relative to the first end 84a for adjusting a compression force of the primary spring 84 applied to the rack guide 82 during operation of the vehicle in which the vehicle rack guide system 80 is installed.

The rack guide system 80 can further include a motor 90 for providing torque and rotational displacement, and ultimately for adjusting the relative position of the end 84b of the primary spring 84 opposite the rack guide 82. Accordingly, the motor 90 is operatively connected to the primary spring 84 for continuously adjusting the compression force of the primary spring 84, as desired. Specifically, the motor 90 is operatively connected to the second end 84b of the primary spring 84 for adjustably moving the second end 84b of the primary spring relative to the first end 84A of the primary spring 84. Since the spring 84 urges the rack guide 82 into the rack 40, adjusting the compression of the spring 84 adjusts the friction force applied to the rack 40 by the rack guide 82. The motor 90 can be a brush direct current (DC) motor, a brushless DC motor, a stepper motor or any other suitable type of motor.

In the illustrated embodiment, the rack guide system 80 additionally includes a drive train 92 operatively connecting the motor 90 to the second end 84b of the primary spring 84. The drive train 92 converts rotation of an output shaft 94 of the motor 90 into linear movement of the second end 84b of the primary spring 84 relative to the first end 84a of the primary spring 84. In addition to the motor output shaft 94, the drive train 92 can include a reduction gear 96 operatively connected to the motor output shaft 94 (e.g., the output shaft 94 can have teeth engaged with teeth of the reduction gear 96) for reducing rotational velocity from the motor 90. The reduction gear 96 can be a harmonic drive, can employ planetary gears, a worm-wheel and/or spur gears. The drive train 92 can also include a screw shaft 98 operatively connected to the reduction gear 96 for co-rotation therewith (e.g., the screw shaft 98 can have teeth threadedly engaged with teeth of the reduction gear 96 or an output shaft of the reduction gear 96, or the screw shaft 98 can be integrally and coaxially formed with the reduction gear 96).

Additionally the drive train 92 can include a nut 100 threadedly engaged with the screw shaft 98 and slidably received within a housing. The screw shaft 98 can drive the nut 100 to convert rotational motion to translational or linear motion. More particularly, the nut 100 can be slidably received within a rack guide housing portion 102 of a steering rack housing 104 for translating rotation of the screw shaft 98 into linear movement. The nut 100 can be fixed to the end 84b of the primary spring 84 opposite the rack guide 82 for adjusting the relative position of the end 84b relative to the rack guide 82. The steering rack housing 104 can be similar to the steering rack housing 18 of FIG. 4 except that the steering rack housing 104 includes the rack guide housing portion 102, the reduction gear housing portion 106 and the motor housing portion 108, which are collectively configured to accommodate the rack guide system 80. In this regard, the rack guide 82, the drive train 92 and the motor 90 can be integrated in a common housing, such as the steering rack housing 104, or more particularly the housing portions 102, 106, 108. As shown, the housing portions 106, 108 can be bolted via bolts 110 to the housing portion 102. While shown as three separable housing portions 102, 106, 108, it is to be appreciated that these could be formed as a single housing (or any number of housing portions) if desired.

In the illustrated embodiment, the housing portion 102 defines a sliding slot 116 which cooperatively receives the nut 100 allowing for axial movement of the nut 100. The sliding slot 116 can prevent relative rotation between the nut 100 and the housing portion 102. The end 84b of the primary spring 84 rests against the nut 100 such that the relative position of the nut 100 within the housing portion 102 controls the position of the end 84b relative to the housing portion 102 and relative to the rack guide 82. Thus, the position of the nut 100 controls the amount of compression of the spring 84 and thereby the amount of force exerted by the spring 84 on the rack guide 82.

In addition to limiting relative rotation between the nut 100 and the housing portion 102, the sliding slot 116 can also be designed with a particular depth h as shown in FIG. 5. The depth h is defined by a shoulder 118 that limits the maximum stroke for the nut 100 in a direction toward the rack guide 82. In this way, the maximum force acting on the rack guide 82 and the maximum slide friction of the steering rack 40 can be constrained. This can advantageously prevent "lock-up" of the steering rack 40 that could otherwise occur due to excessive friction (e.g., if the motor 90 or some other component were to fail).

The rack guide system 80 can further include a controller 120 operatively connected to the motor 90. As will be described in more detail below, the controller 120 can command the motor 90 to adjust the compression force of the primary spring 84 in response to one or more driving conditions or operating parameters, such as vehicle speed, steering wheel angle, steering wheel torque and vehicle yaw-rate. Through the controller 120, and the motor 90 via the drive train 92, the controllable steering rack guide system 80 can apply adjustable rack friction levels to the rack guide 82 and these can be controlled by the controller 120. More specifically, in operation, the controller 120, through the motor 90 and the drive train 92, controls and adjusts the length of the primary spring 84. Since the primary spring 84 is pressing on the rack guide 82, the normal force and the resultant friction between the rack guide 82 and the steering rack 40 are thus controlled.

The controller 120 can be type suitable for providing a control signal to the motor 90, as is understood by those skilled in the art. In one embodiment, the controller 120 can provide a mechanical signal, such as a pneumatic or hydraulic pressure signal, to the motor 90. In another embodiment, the controller 120 can provide an electrical signal to the motor 90. In any case, the controller 120 can be a stand-alone control unit or it could be integrated with some other controller on the vehicle in which the rack guide system 80 is mounted. In one embodiment, when the controllable steering rack guide system 80 is integrated into a vehicle chassis system, the controller 120 can be integrated into the vehicle's electronic control unit (ECU) and can adjust sliding friction level of the steering rack 40 in response to various driving conditions and operating parameters of the vehicle.

The rack guide system 80 can additionally include one or more sensors for sensing operating conditions and sending corresponding feedback signals to the controller 120. Each such sensor can provide a mechanical or electrical feedback signal appropriate for the controller 120 and/or the sensors. In one embodiment, a load sensor 124 is provided for sensing a load applied to the rack guide 82. As shown, the load sensor 124 can be operatively connected to the controller for providing feedback to the controller 120. In the same or another embodiment, a sensor 126 can be provided for measuring linear displacement of the end 84b of the primary spring 84 opposite the rack guide 82. As shown, the sensor 126 can be operatively connected to the controller 120 for providing feedback to the controller 120. By way of example, the sensor 126 can be a rotation sensor that senses rotation of the screw shaft 98 to thereby measure linear displacement of the nut 100. It is to be appreciated that the sensors 124, 126 are exemplary only and are only schematically shown. The sensors 124, 126 could be disposed inside the housing 104 or elsewhere in the steering system. Also, it is to be appreciated that any number and type of sensors can be selected by one skilled in the art to work within the rack guide system 80.

In the illustrated embodiment, the rack guide system 80 can additionally include a secondary spring 130 applying a secondary compression force on the rack guide 82 for forcing the rack guide 82 radially toward the steering rack 40. The total friction force applied can be the sum of the fixed force applied by the secondary spring 130 and the variably force applied by the primary spring 84. As shown, a first end 130a of the secondary spring can rest against the rack guide 82, particularly against an outer axial face 132 of the rack guide 82 disposed annularly about the recess 86. The other end 130b of the secondary spring 130 can rest against a rack guide screw 134. In the illustrated embodiment, the rack guide screw 134 is threadedly secured to the housing portion 102. More specifically, the housing portion 102 can include the threaded counterbore 136 in which the rack guide screw 134 is threadedly received.

By this arrangement, the first end 130a of the secondary spring 130 is linearly fixed relative to the rack guide 182 and the second end 130b of the secondary spring 130 is linearly fixed relative to the first end 130a of the secondary spring 130, including during operation of the vehicle. The rack guide screw 134 is moveable via its threaded engagement with the housing portion 102 axiallly to adjust the compression of the secondary spring 130, but only during assembly or while steering system is disassembled. Accordingly, the secondary compression force of the secondary spring 130 has an adjustable setting; however, this setting remains substantially constant during operation of the pinion 16 and the steering rack 40, and more generally during operation of the vehicle.

In other words, once the rack guide screw 134 is set in position to thereby set a compression level of the secondary spring 130 and the remainder of the rack guide system 80 assembled, the compression level provided by the secondary spring 130 remains constant and is not adjustable without disassembling the rack guide system 80. By this arrangement, the secondary spring 130 can be used to add a preload force on the rack guide 82. However, it is to be appreciated by those skilled in the art that the secondary spring 130 and rack guide screw 134 are completely optional. In one embodiment, the rack guide system 50 does not include the secondary spring 130 and the rack guide screw 134. Optionally, a lock nut or other type of locking mechanism (neither shown) can be used to lock the rack guide screw 134 in his position relative to the housing portion 102.

Advantages of the controllable steering rack guide system 80 include that the applied steering rack sliding friction is controllable and such control is continuous (instead of simply being on or off). In addition, when the secondary spring 130 is included, a normal rack guide force applied by the secondary spring 130 can be set. Under normal driving conditions, the motor 120 need not be energized. However, the motor 90 can be energized only when necessary for higher toughness, and thus the controllable steering rack guide system 80 is energy-efficient, low-power demanding. Additional advantages of the rack guide system 80 includes that it can be easily manufactured and operates as safely as known rack guide mechanisms.

Figure 6:
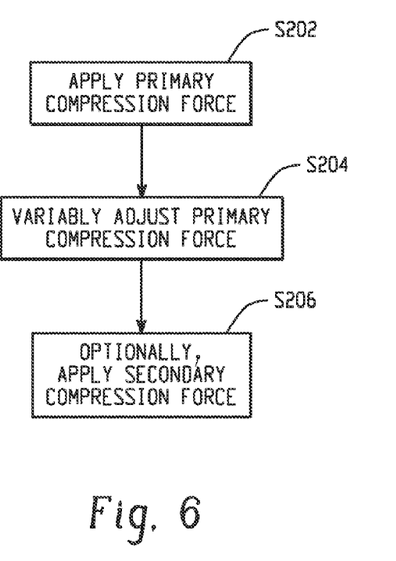
FIG. 6 is a block diagram illustrating a method for applying a controllable friction force to a steering rack in a vehicle.

With reference now to FIG. 6, a method for applying a controlled friction force to a steering rack in a vehicle will now be described. In particular, the method of FIG. 6 will be described in reference to the rack guide system 80 of FIG. 4, though it is to be appreciated by those skilled in the art that the described method can be applied to other rack guide systems than that of the illustrated embodiment. In the method, a primary compression force is applied to the steering rack 40 from the primary compression spring 84 (S202). The primary compression force of the primary compression spring 34 can be variably adjusted during operation of the vehicle (S204). As already described herein, variably adjusting the primary compression force can include adjusting linear displacement between two axially spaced apart datum points on the primary spring 84, such as the end 84*a* and the end 84*b*. In particular, adjusting linear displacement between two axially spaced apart datum points (e.g., ends 84*a* and 84*b*) can include providing and using the motor 90 to linearly displace one of the datum points (e.g., end 84*b*) relative to the other of the datum points (e.g., end 84*a*). Additionally, and optionally, a secondary compression force can be applied to the steering rack 40 from the secondary compression spring 130 (S206).

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A controllable steering rack guide system, comprising:
a pinion including pinion gear teeth;
a steering rack including rack gear teeth engaged with the pinion gear teeth of the pinion;
a rack guide radially movable relative to the steering rack applying a radial force to the steering rack; and
a primary spring applying a compression force on the rack guide forcing the rack guide radially toward the steering rack, the compression force of the primary spring continuously and variably adjusting during operation of the pinion and the steering rack and a controller actively controlling said compression of the primary spring throughout a plurality of positions between a maximum displacement position, and a minimum displacement position during operation of the pinion and steering rack.

2. The controllable steering rack of claim 1 further including a secondary spring applying a secondary compression force on the rack guide for forcing the rack guide radially toward the steering rack.

3. The controllable steering rack of claim 2 wherein the secondary compression force of the secondary spring has an adjustable setting that remains substantially constant during operation of the pinion and the steering rack.

4. The controllable steering rack guide system of claim 1 wherein the compression force of the primary spring is continuously and variably adjustable by varying an amount of compression of the primary spring, the amount of compression variable to any amount between a maximum compression and a minimum compression.

5. The controllable steering rack guide system of claim 4 wherein the amount of compression of the primary spring is varied by variably adjusting a relative position of an end of the primary spring opposite the rack guide.

6. The controllable steering rack guide system of claim 5 further including a motor for variably adjusting the relative position of the end of the primary spring opposite the rack guide.

7. The controllable steering rack guide system of claim 1 further including a motor operatively connected to the primary spring for continuously and variably adjusting the compression force of the primary spring.

8. A controllable steering rack guide system comprising:
a pinion including pinion gear teeth;
a steering rack including rack gear teeth engaged with the pinion gear teeth of the pinion;
a rack guide radially movable relative to the steering rack for applying a radial force to the steering rack;
a primary spring applying a compression force on the rack guide for forcing the rack guide radially toward the steering rack, the compression force of the primary spring continuously adjustable during operation of the pinion and the steering rack; and
a motor operatively connected to the primary spring for continuously adjusting the compression force of the primary spring,
wherein the motor is operatively connected to the primary spring through a drive train including:
a motor output shaft;
a reduction gear operatively connected to the motor output shaft;
a screw shaft operatively connected to the reduction gear for co-rotation therewith; and
a nut threadedly engaged with the screw shaft and slidably received within a housing for translating rotation of the screw shaft into linear movement, the nut fixed to an end of the primary spring opposite the rack guide for adjusting the relative position of the end relative to the rack guide.

9. The controllable steering rack guide system of claim 8 wherein the rack guide, the drive train and the motor are integrated in a common housing.

10. The controllable steering rack guide system of claim 8 further including a rotation sensor that senses rotation of the screw shaft to measure linear displacement of the nut.

11. The controllable steering rack guide system of claim 8 wherein slidable movement of the nut toward the rack guide is limited by a shoulder of the housing.

12. The controllable steering rack guide system of claim 7 wherein the controller is operatively connected to the motor, the controller commanding the motor to variably adjust the compression force of the primary spring in response to one or more driving conditions or operating parameters.

13. The controllable steering rack guide system of claim 12 further including a load sensor for sensing a load applied to the rack guide, the load sensor operatively connected to the controller for providing feedback to the controller.

14. The controllable steering rack guide system of claim 12 further including a sensor for measuring linear displacement of an end of the primary spring opposite the rack guide, the sensor operatively connected to the controller for providing feedback to the controller.

15. The steering rack guide assembly of claim 1 further including:
a motor operatively connected to a second end of the primary spring for adjustably moving the second end of the primary spring relative to the first end of the primary spring a variable amount.

16. The steering rack guide assembly of claim 15 further including:
a drive train operatively connecting the motor to the second end of the primary spring, the drive train converting rotation of an output shaft of the motor into linear movement of the second end of the primary spring relative to the first end of the primary spring.

17. The steering rack guide assembly of claim 1 further including a secondary spring for applying a secondary compression force on the rack guide.

18. The steering rack guide assembly of claim 17 wherein a first end of the secondary spring is linearly fixed relative to the rack guide and a second end of the secondary spring is linearly fixed relative to the first end of the secondary spring during operation of the vehicle.

19. A method for applying a controllable friction force of a steering rack in a vehicle, comprising: providing a pinion including pinion gear teeth;

providing a steering rack including rack gear teeth engaged with the pinion gear teeth of the pinion;

providing a rack guide radially movable relative to the steering rack and applying a radial force to the steering rack; and providing a primary spring and applying a compression force on the rack guide and forcing the rack guide radially toward the steering rack, the compression force of the primary spring continuously and variably adjusts during operation of the pinion and the steering rack; and providing a controller and actively controlling said compression of the primary spring throughout a plurality of positions between a maximum displacement position, and a minimum displacement position during operation of the pinion and steering rack.

20. The method of claim 19 wherein variably adjusting the primary compression force includes adjusting linear displacement to any position between two axially spaced apart datum points on the primary spring.

21. The method of claim 20 wherein adjusting linear displacement between two axially spaced apart datum points includes providing and using a motor to linearly displace one of the datum points relative to the other of the datum points.

22. The method of claim 19 further including:

applying a secondary compression force to the steering rack from a secondary compression spring.

* * * * *